United States Patent Office 3,350,326
Patented Oct. 31, 1967

3,350,326
PROCESS FOR THE PRODUCTION OF POLYMERIC BORON NITROGEN COMPOUNDS
Elmar-Manfred Horn, Aachen, Klaus Kleine-Weischede, Leverkusen, Konrad Lang, Cologne-Stammheim, and Hans Niederprum, Monnheim, Germany, assignors to Farbenfabriken Bayer Aktiengesellschaft, Leverkusen, Germany, a German corporation
No Drawing. Filed Oct. 7, 1964, Ser. No. 402,351
Claims priority, application Germany, Oct. 16, 1963, F 41,000
7 Claims. (Cl. 260—2)

The present invention relates to a process for the production of polymeric organic boron nitrogen compounds. More precisely, the present invention relates to polymeric organic boron nitrogen compounds obtained by reacting amine boranes with nitriles which contain silicon or phosphorus atoms.

Copending application Ser. No. 275,471, filed April 8, 1963, now U.S. Patent 3,238,152, describes a process for the production of polymeric organic boron nitrogen compounds wherein amine boranes are reacted with nitriles of the general formula $$R^1(CN)_n$$

wherein $R^1$ is a hydrocarbon radical and $n$ an integer of at least 1, preferably of 1 to 6.

It has been found that phosphorus- or silicon-containing mono- or polycyanides can be reacted with amine boranes with the splitting off of hydrogen and the amine component R of the amine borane $R \rightarrow BH_3$, to give high-molecular weight organic boron nitrogen compounds which contain phosphorus or silicon and also active hydrogen (i.e. hydridic hydrogen linked directly to boron). One mol of amine borane is preferably used for each mol of the nitrile group, but the process according to the invention may also be carried out with other mol ratios of nitrile to amine borane.

Dependent on the process conditions and on the type of the silicon- or phosphorus-containing nitriles employed, resins, rubber-like masses, pastes or oils are obtained. These new compounds exhibit an extraordinary thermal stability and can therefore be used as lubricants, as additives to lubricants and as starting materials for the production of neutron-absorbing substances.

Reactions of nitriles with boron compounds are known as such. For example, an unstable complex of the composition $CH_3CN.BH_3$ [Chem. Rev. 31, 1 (1942)] is obtained from acetonitrile and diborane. A reaction of acetonitrile with boron trifluoride has likewise been observed, which results in a complex of the formula $CH_3CN.BF_3$ [Acta Cryst. 3, 121 (1950)]. It is also known that certain aliphatic nitriles can be reacted with diborane to give specific B,B',B''-trihydrido-N,N',N''-triorgano-borazoles (U.S. Patent 3,008,988). Finally, in German published patent specification 1,147,944 there is described the preparation of B,B',B''-trihydrido-N,N',N''-triorgano-borazoles from borohydrides or aluminum hydrides, boron halides and organic monocyanides.

The object of the present invention is an improvement of the process for the production of polymeric organic boron nitrogen compounds, wherein amine boranes of the general formula $$R \rightarrow BH_3$$

wherein R is a primary, secondary or tertiary aliphatic, cycloaliphatic or aromatic amine, a heterocyclic nitrogen base or a mixed aliphatic, cycloaliphatic, aromatic amine, are heated with nitriles at a temperature of between 20–250° C., the improvement which comprises heating said amine boranes with nitriles of the general formula $$R^2(CN)_m$$

wherein $R^2$ is a hydrocarbon radical containing phosphorus, silicon, oxygen, sulfur or nitrogen atoms and $m$ is an integer of at least 1, possibly in admixture with nitriles of the formula $$R^1(CN)_n$$

wherein $R^1$ is a hydrocarbon radical and $n$ is an integer of at least 1, preferably of 1 to 6.

The amine boranes which can be used for the present process correspond to the general formula $$R \rightarrow BH_3$$

wherein R is a primary, secondary or tertiary alkyl, cycloalkyl or aryl amine, or a mixed alkyl-cycloalkyl-aryl amine, or pyridine or piperidine. Alkyl radicals with 1 to 20 carbon atoms are preferred. Because they are especially readily obtainable, N-triorgano-amine boranes are preferably used, such as e.g. N-trimethyl-amine borane, N-triethyl-amine borane, N-tripropyl-amine borane, N-diethyl-N-butyl-amine borane, N-dimethyl-N-cyclohexyl-amine borane, N-dimethyl-N-phenyl-amine borane, or pyridine-amine borane, but other amine boranes such as e.g. N-di-n-propyl-amine borane, piperidine-amine borane or N-lauryl-amine borane can also be employed.

The nitriles which may be used in the process according to the invention can be described by the formula $$R^3{}_p(Z-C\equiv N)_q$$

In this formula, Z can be an alkylene, oxaalkylene, thiaalkylene, azaalkylene, having from 1 to 6 carbon atoms, arylene, oxaarylene group and a group of the formula $$\begin{matrix} -R^4 \\ \phantom{-}\diagdown \\ \phantom{-R^4}CH-R^4- \\ \phantom{-}\diagup \\ -R^4 \end{matrix}$$

or a group of the formula $$\begin{matrix} -R^4 \\ \phantom{-}\diagdown \\ \phantom{-R^4}N-R^4- \\ \phantom{-}\diagup \\ -R^4 \end{matrix}$$

wherein $R^4$ stands for an alkylene group (preferably with 1 to 6 carbon atoms); $R^3$ stands for

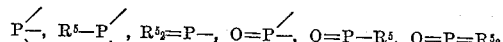

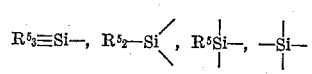

wherein $R^5$ stands for a hydrogen atom or for identical or different alkyl, alkenyl or alkinyl groups, cycloalkyl, aralkyl, alkaryl, aryl, alkoxy or aryloxy groups. Furthermore, $R^3$ can stand for disioxane radicals or for straight-chain, branched-chain or cyclic polysiloxane radicals which carry $q(Z-C\equiv N)$ groups on one or several silicon atoms; $q$ and $p$ denote a whole number of at least 1, in case of $R^3$ being a silane $q$ is an integer of 1 and $p$ is an integer of 1–4, in case of $R^3$ being a phosphorus containing group $q$ is an integer of 1 and $p$ is an integer of 1–3.

In the usable silicon- or phosphorus-containing mono- or polycyanides, the nitrile groups are always linked to the silicon or phosphorus atoms via a bridge consisting of at least one carbon atom. Moreover, oxygen, sulfur and/or nitrogen atoms may be additional members of this linking bridge. As phosphorus-containing nitriles there may be used the following compounds: tris-cyanomethyl-phosphine $P(CH_2CN)_3$, tris - (2 - cyanoethyl)- phosphine P(CH₂CH₂CN)₃, mono- and diorgano-(2-cyanoethyl)-phosphines R⁵P(CH₂CH₂CN)₂ or $$R^5{}_2PCH_2CH_2CN$$

wherein R⁵ stands for the radicals already defined, such as for example dioctyl-(2-cyanoethyl)-phosphine, bis-(2 - cyanoethyl) - cyclohexyl-phosphine, diphenyl-bis-(2-cyanoethyl)-phosphine, bis-(2-methyl-phenyl)-(2-cyanoethyl)-phosphine, bis-(2-cyanoethyl)-phosphine $$HP(CH_2CH_2CN)_2$$

2 - cyanoethyl-phosphine H₂P(CH₂CH₂CN), phosphine oxides, as for example tris-(2-cyanoethyl)phosphine oxide OP(CH₂CH₂CN)₃, phosphinous- and phosphonous acid derivatives, as for example, diethylphosphinous acid-(3 - cyanopropyl) - ester (C₂H₅)₂POCH₂CH₂CH₂CN or butylphosphonous acid-di-(4-cyanophenyl)-ester $$C_4H_9P—(OC_6H_4CN)_2$$

as well as phosphinic and phosphonic acid derivatives, as (2-cyanoethyl)-phosphonic acid dibutyl ester $$NCCH_2CH_2P(O)(OC_4H_9)_2$$

or dipropylphosphinic acid-(N-cyanomethyl - 2 - aminobenzoic acid)-ester and phosphoric acid-esters, such as phosphoric acid-tris-(4-cyanophenyl ester)

$$OP(OC_6H_4CN)_3$$

The silicon-containing mono- or polycyanides usable in the process according to the present invention can be silane or siloxane derivatives. The usable silane derivatives can be described by the general formula $$R^5{}_xSi[(Z—C≡N)_q]_{4-x}$$

wherein R⁵, Z and q have the meaning given above and $x$ can be a whole number from 0 to 3.

Examples of usable silane derivatives are:
trimethyl-(2-cyanoethyl)-silane $$(CH_3)_3SiCH_2CH_2CN$$

methyldiethoxy-(2-cyanoethyl)-silane $$CH_3(C_2H_5O)_2SiCH_2CH_2CN$$

bis-(4-methyl-phenyl)-bis-(4-cyanophenyl)-silane $$(CH_3C_6H_4)_2Si(C_6H_4CN)_2$$

di-(tert. butoxy)-bis-(2-cyanoethoxy)-silane $$(C_4H_9O)_2Si(OCH_2CH_2CN)_2$$

trimethylsilyl-methyl)-2-cyanoethyl)-ether $$(CH_3)_3SiCH_2OCH_2CH_2CN$$

and (3-trimethylsilyl-n-propyl)-(2'-cyanoethyl)-thio-ether $$(CH_3)_3SiCH_2CH_2CH_2SCH_2CH_2CN$$

The chain- or ring-shaped siloxane derivatives which can be used in the present process contain, besides one or several siloxane linkages, one or also several nitrile groups which are linked to the silicon atoms via at least one carbon atom each and possibly an additional O, S or N atom. The remaining valencies of the silicon atoms of these siloxane derivatives are saturated by alkyl, cycloalkyl, aryl, alkoxy and/or aryloxy groups, especially by methyl or phenyl radicals. Examples of siloxane derivatives which can be used in the present process are:

1,1,3,3-tetramethyl-3-(β-cyanoethyl)-disiloxane $$H(CH_3)_2SiOSi(CH_3)_2CH_2CH_2CN$$

1,1,1,3,3-pentamethyl-3-(β-cyanoethyl)-disiloxane $$(CH_3)_3SiOSi(CH_3)_2CH_2CH_2CN$$

linear α-trimethylsilyl-ω-(dimethyl-β-cyanoethyl)-poly-dimethylsiloxanes of the general formula $$(CH_3)_3SiO—[Si(CH_3)_2O]_nSi(CH_3)_2CH_2CH_2CN$$

cyanomethyl-hepta-methyltetrasiloxane $$[(CH_3)_2SiO]_3[CH_3(H_2CCN)SiO]$$

4-cyano-2,2,6,6-tetramethyl-2,6-disila-tetrahydropyran

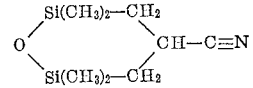

1,3-bis-(β-cyanoethyl)-1,1,3,3-tetramethyl-disiloxane $$NCCH_2CH_2Si(CH_3)_2OSi(CH_3)_2CH_2CH_2CN$$

1,3-bis-(p-cyanophenyl)-1,1,3,3-tetramethyl-disiloxane $$(NC—C_6H_4)(CH_3)_2SiOSi(CH_3)_2(C_6H_4—CN)$$

α,ω-bis-(γ-cyanopropyl)-poly-methyl-poly-siloxanes $$NCCH_2CH_2CH_2Si(CH_3)_2O[Si(CH_3)_2O]_r$$
$$Si(CH_3)_2CH_2CH_2CH_2CN$$

polymeric siloxanes with lateral β-cyanoethyl groups of the following constitution:

$$(CH_3)_3SiO[Si(CH_3)_2O]_r[CH_3Si(CH_2CH_2CN)O]_rSi(CH_3)_3$$

and polymeric siloxanes of the constitution:

$$(CH_3)_3SiO[Si(CH_3)_2O][Si(CH_3)_2CH_2CH(CN)CH_2Si(CH_3)_2O]_rSi(CH_3)_3$$

Furthermore, the silicon- or phosphorus-containing radical containing one or several nitrile groups may also be olefinically and acetylenically unsaturated. If unsaturated nitriles of this type, such as for example allyl-bis-(2 - cyanoethyl)-phosphine or vinyl-dimethyl-(2 - cyanoethyl)-silane, are used, there takes place in most cases under the conditions of the process according to the invention, besides the reaction of amine borane with the nitrile group, a hydroborination of the double or triple bond, which frequently leads to an additional cross-linking of the silicon- or phosphorus-containing polymeric boron-nitrogen compounds.

A further possibility of varying the properties of the silicon- or phosphorus-containing polymeric boron-nitrogen compounds produced according to the invention consists in employing the nitrile component not as a defined uniform compound, but to use any mixtures of nitriles. These mixtures may also contain organic nitriles which contain no silicon or phosphorus atoms, of the formula R¹(CN)ₙ, wherein R¹ is a hydrocarbon radical and $n$ a whole number of at least 1, preferably of 1 to 6. R¹ can be a $C_1$–$C_{30}$ alkyl, $C_1$–$C_{30}$ alkenyl, $C_1$–$C_{30}$ alkinyl, cycloalkyl or aryl group which, besides $n(CN)$-substituents, may also contain one or several identical or different alkyl, cycloalkyl, aryl, alkoxy, aryloxy or halogen substituents.

As examples of the organic mononitrites, there may be mentioned: acetonitrile, propionitrile, butyronitrile, the nitriles of octane, dodecane- and hexane-carboxylic acid, benzyl cyanide, possibly nucleo-substituted hexahydrobenzoic acid nitriles, possibly nucleo-substituted benzonitriles (for example benzonitrile and 2-chlorobenzonitrile) and possibly nucleo-substituted naphthonitriles; examples of compounds with several nitrile groups in the molecule are: malonic acid dinitrile, glutaric acid dinitrile, adipic acid dinitrile, cyanoform and 1,1,3,3-tetracyanopropane. The organic radical containing one or several nitrile groups may moreover be saturated or aromatically, olefinically or acetylenically unsaturated, for example 1,4-dicyanobutene-(2).

The reactions on which the process according to the invention is based are carried out at temperatures between about 20 and 250° C., expediently above 100° C., whereby it is possible to operate under normal pressure, under foreign gas pressure (for example under nitrogen pressure) or under the hydrogen pressure arising from the hydrogen split off during the reaction.

The properties of the boron-containing polymers obtainable by the present process can furthermore be influenced to a great extent by adopting a specific procedure for the preparation, for example:

(1) The nitrile and amine borane components are mixed and then heated under normal or increased pressure to the reaction temperature, or (2) One of the starting products is heated to the reaction temperature and the other component is then added, for example through a dropping funnel or—when working under pressure—for example by means of a dosing pump, or (3) The reactions as described under (1) as well as under (2) are carried out in an inert solvent or dispersing agent. For example paraffin oils, benzene, toluene, xylene or dibutyl ether can be used for this purpose.

The following examples are given for the purpose of illustrating the invention.

*Example 1*

A suspension of 9 g. (47 millimol) of tris-(2-cyanoethyl)-phosphine, $P(CH_2CH_2CN)_3$, in 200 ml. of xylene is placed into a round flask which is equipped with stirrer, immersed thermometer, dropping funnel and descending condenser with connected distillation receiver. To the suspension, heated to about 80° C., there are added dropwise in the course of about 15 minutes, 24 g. (200 millimol) of N-triethyl-amine borane and the reaction mixture is then heated for about one hour at 140° C. The liberated triethylamine is thereby distilled off. After the volatile parts have been evaporated under vacuum, 12 g. of a solid yellow resin are obtained which contains 9.82% of phosphorus, 8.86% of boron and 13.87% of nitrogen. This resin begins to sinter at 420° C. with a slight brown coloration; no melting could be observed at temperatures up to 500° C.

*Example 2*

100 g. of a partly 2-cyanoethyl-substituted polymethyl-polysiloxane, containing 2.47% of nitrogen, of the constitution

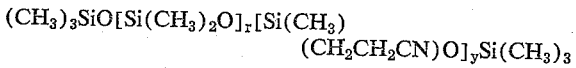

$(CH_3)_3SiO[Si(CH_3)_2O]_x[Si(CH_3)(CH_2CH_2CN)O]_ySi(CH_3)_3$ and 150 ml. of isopropyl-benzene are placed into the device described above. The solution is heated to 130° C., whilst stirring, and 18 g. (0.19 mol) of pyridine-borine are then added dropwise in the course of about 15 minutes. During the addition of the pyridine-borine the reaction mixture initially turns light yellow. The solution subsequently becomes viscous and the content of the flask finally solidifies to a solid slightly yellow-colored rubber-like mass. After the solvent and the remaining pyridine have been evaporated under vacuum, 101 g. of a pale yellow rubberlike thermally stable product are obtained which contains 2.2% of nitrogen and 1.7% of boron.

*Example 3*

According to Example 2, 100 g. of a partly 2-cyanoethyl - substituted polymethyl - polysiloxane, containing 2.95% of nitrogen, of the constitution $(CH_3)_3SiO[Si(CH_3)_2O]_x[Si(CH_3)(CH_2CH_2CN)O]_ySi(CH_3)_3$ dissolved in 200 ml. of 1-methyl-4-isopropylbenzene, are reacted with 27 g. (0.24 mol) of N-triethyl-amine borane at 130° C. After the volatile parts have been evaporated under vacuum at 130–140° C., 102 g. of a yellow-colored rubber-like thermally stable product are obtained which contains 1.34% of boron.

*Example 4*

To a mixture of 250 ml. of isopropylbenzene and 70 g. of a co-polymeric cyanoalkylene-siloxane of the constitution

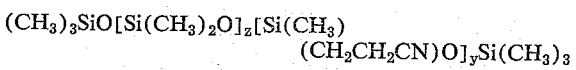

$(CH_3)_3SiO[Si(CH_3)_2O]_x[Si(CH_3)_2CH_2CHCH_2Si(CH_3)_2O]_ySi(CH_3)_3$
$\quad\quad\quad\quad\quad\quad\quad\quad\quad\quad\quad\quad\quad\quad\quad\;\;|$
$\quad\quad\quad\quad\quad\quad\quad\quad\quad\quad\quad\quad\quad\quad\;\;CN$ containing 2.6% of nitrogen, 16.5 g. (0.14 mol) of N-triethylamine borane are added at 130–135° C. in the course of about 10 minutes. The reaction mixture is then heated to 160–170° C. and the triethylamine which has been split off and the bulk of the isopropyl benzene used as solvent are distilled off at that temperature. The remaining volatile parts are removed under vacuum and 72 g. of a paste-like, thermally very stable product are then obtained which contains 2.0% of boron solidifies, when exposed to air, to a rubber-like material.

*Example 5*

In accordance with the above examples, 20 g. of a yellow-colored paste-like, thermally stable product, containing 4.8% of boron and 11.0% of nitrogen, are obtained by reaction of 22.8 g. (0.1 mol) of 4-(2'-cyanoethyl)-2,2,6,6-tetramethyl-2,6-disila-morpholine

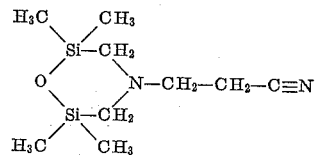

suspended in 100 ml. of di-n-butyl ether, with 12.7 g. (0.11 mol) of N-triethyl-amine borane.

*Example 6*

From 75 g. of benzyl cyanide, 25 g. of the partly 2-cyanoethyl-substituted polymethyl-polysiloxane employed in Example 2 and 87 g. of N-triethyl-amine borane, 110 g. of a yellow to orange-colored resin are obtained which contains 8.8% of nitrogen, 8.2% of silicon and 6.6% of boron. This resin becomes orange-colored at 180° C. and red-brown at 420° C.; no melting could be observed at temperatures up to 510° C.

What is claimed is:

1. A process for the production of polymeric organic boron nitrogen compounds, which comprises reacting an amine borane of the formula $$R \rightarrow BH_3$$

wherein R represents a member selected from the group consisting of tertiary alkylamine and pyridine amine at a temperature of between 20 to 250° C. with a nitrile of the formula selected from the group (1) phosphorus containing nitriles of the formula

$$R^5{}_{3-q}\text{—}P(Z\text{—}C\equiv N)_q$$

(2) silicon containing nitriles of the formula $$R^5{}_{4-q}\text{—}Si(Z\text{—}C\equiv N)_q$$

(3) disiloxane compounds of the formula

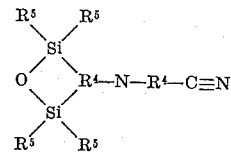

and (4) polysiloxanes containing $q(Z\text{—}C\equiv N)$ - groups, wherein Z represents a member selected from the group consisting of alkylene having 1 to 6 carbon atoms, aza-alkylene having 1 to 6 carbon atoms, phenylene, oxa-alkylene,

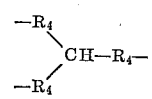

and

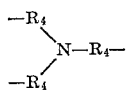

$R^5$ represents a member selected from the group consisting of hydrogen, alkyl, phenyl and alkyl-substituted phenyl, $R^4$ represents alkylene having from 1 to 6 carbon atoms, $q$ is an integer of 1 to 3 in phosphorus containing nitriles and an integer of 1 to 4 in silicon containing nitriles of Formula 2 and in polysiloxanes $q$ is an integer of at least 1.

2. Process according to claim 1, wherein said nitrile is a member selected from the group consisting of tris-cyanomethyl-phosphine, tris-(2 - cyanoethyl) - phosphine, and mono- and di-organo-(2-cyanoethyl)-phosphines.

3. Process according to claim 1, wherein said nitrile is a member selected from the group consisting of trimethyl-(2 - cyanoethyl) - silane $(CH_3)_3SiCH_2CH_2CN$, methyldiethoxy-(2-cyanoethyl)-silane $$CH_3(C_2H_5O)_2SiCH_2CH_2CN$$

bis-(4-methyl-phenyl)-bis-(4-cyanophenyl)-silane $$(CH_3C_6H_4)_2Si(C_6H_4CN)_2$$

di-(tert. butoxy)-bis-(2-cyanoethoxy)-silane $$(C_4H_9O)_2Si(OCH_2CH_2CN)_2$$

trimethylsilyl-methyl-(2-cyanoethyl)-ether $$(CH_3)_3SiCH_2OCH_2CH_2CN$$

and (3-trimethylsilyl-n-propyl)-2'-cyanoethyl) - thioether $(CH_3)_3SiCH_2CH_2CH_2SCH_2CH_2CN$.

4. Improvement according to claim 1, wherein said amine boranes and said nitriles are heated in a molar ratio of nitrile groups to amine borane of about 1:1.

5. Improvement according to claim 1, wherein said amine boranes and nitriles are heated in an inert medium.

6. Process for the production of organic boron nitrogen compounds, the process which comprises heating tris-(2-cyanoethyl)-phosphine in an inert solvent at temperatures of between 80 and 300° C. with N-triethyl-amine borane.

7. Process for the production of polymeric organic boron nitrogen compounds, the process which comprises heating 4-(2'-cyanoethyl)-2,2,6,6-tetramethyl-2,6 - disilamorpholine in an inert solvent at temperatures of between 100 and 200° C. with N-triethylamine borane.

References Cited

UNITED STATES PATENTS

| 3,011,991 | 12/1961 | Anderson et al. | 260—32.4 |
| 3,011,992 | 12/1961 | Anderson | 260—32.4 |

FOREIGN PATENTS 1,000,425  8/1965  Great Britain.

DONALD E. CZAJA, *Primary Examiner.*

L. J. BERCOVITZ, *Examiner.*

M. I. MARQUIS, *Assistant Examiner.*